No. 868,344. PATENTED OCT. 15, 1907.
J. A. HURLEY.
FOOD CHOPPER.
APPLICATION FILED SEPT. 26, 1906.

WITNESSES
H. A. Lamb.
S. W. Atherton.

INVENTOR
John A. Hurley
BY
A. M. Wooster.
ATTORNEY

UNITED STATES PATENT OFFICE.

JOHN A. HURLEY, OF BRIDGEPORT, CONNECTICUT.

FOOD-CHOPPER.

No. 868,344.  Specification of Letters Patent.  Patented Oct. 15, 1907.

Application filed September 26, 1906. Serial No. 336,249.

*To all whom it may concern:*

Be it known that I, JOHN A. HURLEY, a citizen of the United States, residing at Bridgeport, county of Fairfield, State of Connecticut, have invented a new and useful Food-Chopper, of which the following is a specification.

This invention relates to food choppers or cutters of the rotary type, in which a spirally ribbed forcer is mounted within a cylinder having a hopper, the said cylinder having internal ribs. It is well understood of course that, for sanitary reasons, a cutter or chopper of this type must be taken apart for cleaning, and the parts must then be properly assembled again for use. One objection by some housekeepers to the use of appliances of this kind is the difficulty of the separation, cleaning and assembling of the parts.

The object of this invention is to provide a simple and economical structure of food cutter or chopper of the type mentioned, in which the parts may be separated and then assembled after cleaning with the utmost facility.

To this end, the invention consists in the construction and combination of parts substantially as hereinafter described and claimed.

Figure 1:
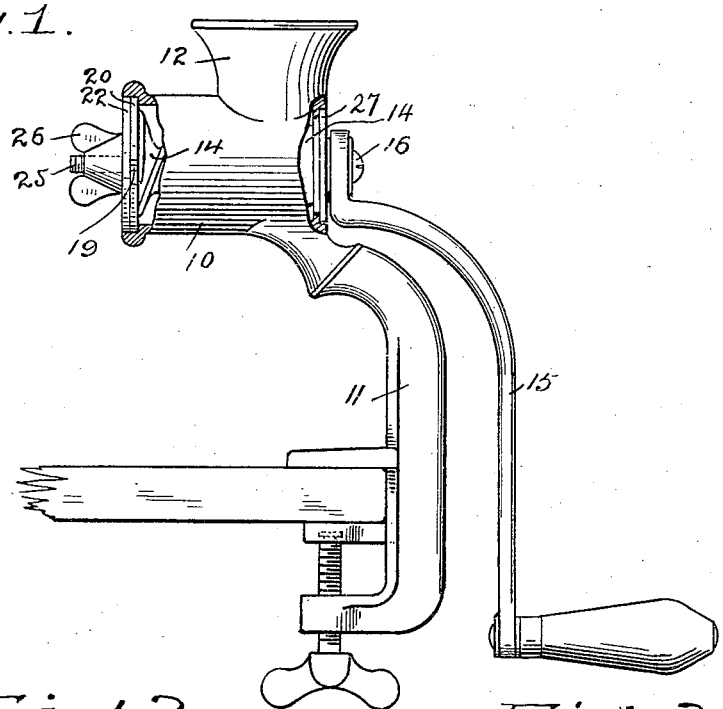
Figures 2, 3:
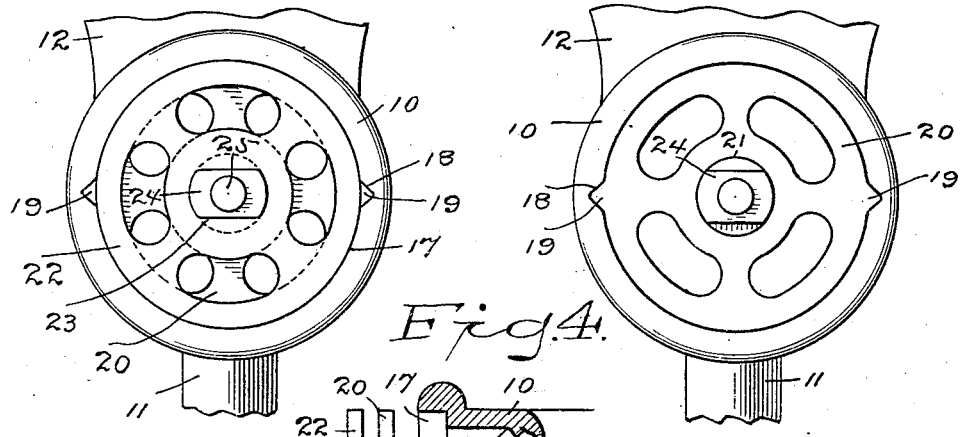
Figure 4:
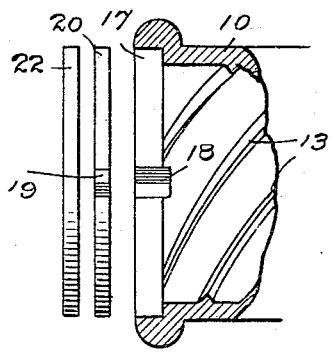

Of the accompanying drawings:—Figure 1 represents a side elevation of a food cutter embodying my invention, a portion of each end of the casing or body being broken out to show the internal structure. Fig. 2 is a detail view, looking from the left of Fig. 1, the clamping or wing nut being removed. Fig. 3 is a view similar to Fig. 2, the wing nut and outer disk being removed. Fig. 4 is a detail sectional view of the outlet end of the cylindrical body, said figure showing also the two disks which coöperate in severing the food into particles.

Similar reference characters indicate the same or similar parts in all views.

The cylindrical body of the device is indicated at 10, said body having a supporting bracket, 11, having a clamp by which it may be secured to a table.

The hopper is indicated at 12, and the internal spiral ribs on the body are indicated at 13, in Fig. 4.

The feeder 14 (see Fig. 1) which may be of the usual spiral form, to force food deposited upon the hopper 12 toward the outlet end of the cylinder, has a handle 15, connected to it by any suitable connection 16 such as a screw, said feeder also having a flange 27 engaging an annular recess in one end of the body to hold the feeder from moving toward the left in Fig. 1.

The outlet, or discharge end of the body 10, is formed with a recess 17, and two short grooves 18, preferably diametrically opposite each other. Said grooves 18 receive the lugs 19 of the inner non-rotary disk 20. That is, the engagement of the lugs 19 in the grooves 18 prevent said disk 20 from rotating. Said disk is formed with openings for the passage of food, as shown in Fig. 3, and with a central circular opening 21, which forms bearing for the outer portion of the shaft of the feeder. A disk 22, similar to the disk 20, but having no lugs, and having a central opening formed with flat sides 23, is fitted to the stud 24, of the feeder 14, said stud having flat sides. In other words, said stud is substantially oblong in cross section and fits a correspondingly shaped opening in the disk 22, so that said disk 22 will be rotated with the feeder 14, although the disk 20 is interposed between said disk 22 and feeder.

The threaded stem 25 of the feeder 14 projects beyond the stud 24, and a wing-nut 26, fitted to said threaded stem serves to hold the disks in position, and, by means of the disks fitting in the recess 17, serves to hold the feeder in place in the cylindrical body.

By removing the wing-nut 26, and slipping the disks off from the end of the feeder, the feeder is free to be withdrawn from the body, in a direction toward the right hand, Fig. 1, so that all of the parts can be readily cleaned. When the parts are separated as described, the opening in the cylindrical body is straight and plain (with the exception of the internal spiral rib) and therefore a brush or cloth can be pushed directly through the interior of the body to clean it. The parts can then be assembled again by simply restoring the feeder to the cylinder, fitting the disk 20 in place so that its lugs 19 engage the grooves 18, and with the stud 24 passing through the circular opening or bearing 21. Then the disk 22 is fitted on the stud 24 and secured there by means of the nut 26. These operations are performed without removing the handle from the feeder, thereby saving time in the operation of separating the parts for cleaning, and in then assembling them. As above stated, the only operation necessary to put the parts in condition for removal, is to remove the wing-nut 26, so that the disks can be slipped off from the end of the feeder, leaving the feeder free to be withdrawn from the body, using the handle for the purpose of withdrawing the feeder. Of course, it will be understood that the cylindrical body is open at the end opposite the end from which the food is discharged, the exit end being the end where the disks are located. Therefore, said disks alone hold the feeder against the backward pressure exerted by the food that is being pushed through the openings in the disks.

Having described my invention, I claim:

1. A rotary food chopper comprising in its construction a body having a cylindrical interior space of substantially uniform diameter from end to end, two removable perforated disks at one end of the body, and a feeder located in said body, the disks being removable at one end of the body and the feeder being removable through the other end, whereby the interior of the body may be cleaned by a cloth or brush projected through it when the feeder and disks are removed.

2. A rotary feed chopper comprising in its construction a body having a cylindrical interior space of substantially uniform diameter from end to end, the said body having an annular recess at its exit end and formed with short grooves, two removable perforated disks in said recess, the inner disk having lugs entering said short grooves, a feeder, means for securing the outer disk to the feeder to rotate therewith, the described shape of the interior of the body permitting the feeder to be removed through one end of the body when the disks have been separated from the feeder.

3. A rotary food chopper comprising in its construction a body having an annular recess at its exit end and formed with diametrically opposite short grooves, a removable perforated disk having lugs engaging said grooves and forme dwith a circular central opening forming a bearing, a feeder having its outer end supported in said bearing, and an outer disk removably secured to the end of the feeder to rotate therewith, the interior space of the body being of substantially uniform diameter from end to end, whereby the feeder may be removed through one end of the body after the disks have been disconnected at the other end.

In testimony whereof I affix my signature, in presence of two witnesses.

JOHN A. HURLEY.

Witnesses:
A. M. WOOSTER,
S. W. ATHERTON.